June 4, 1940.     H. M. HOOD     2,203,413
ARMREST
Filed Feb. 13, 1939
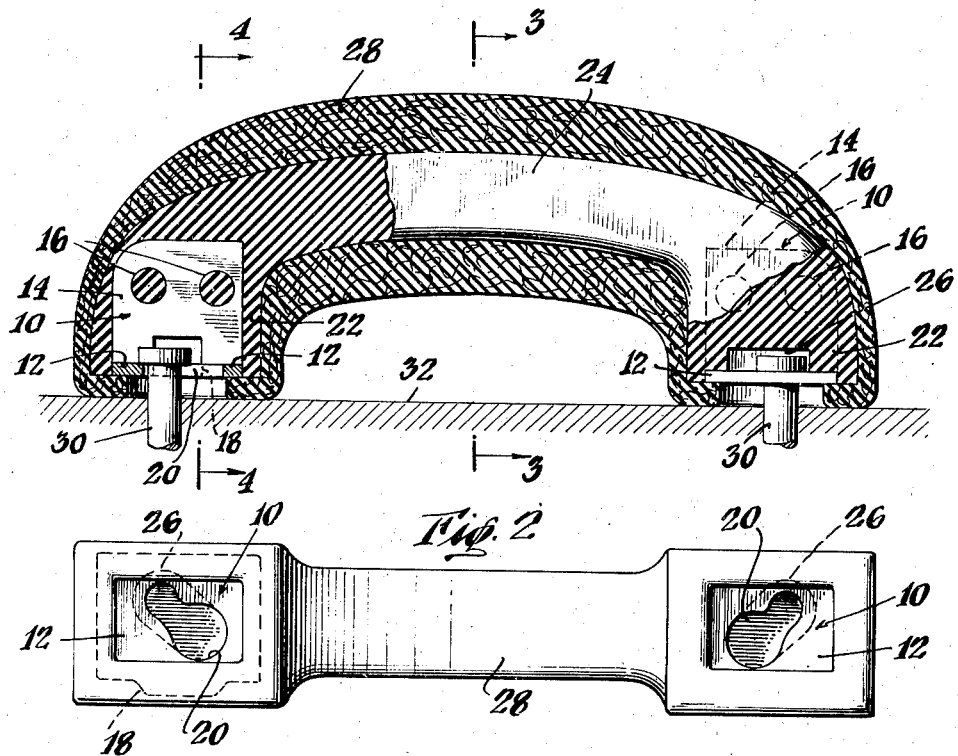
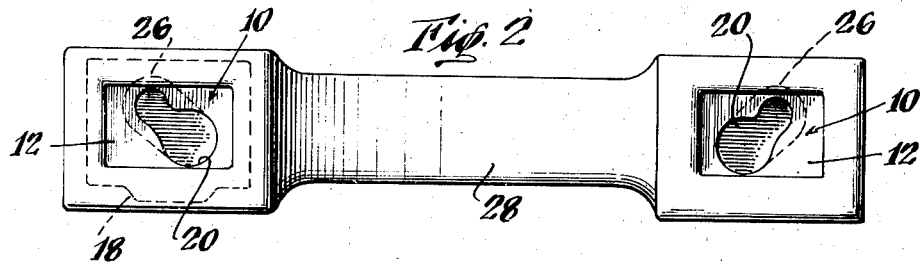
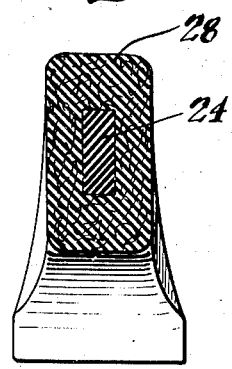 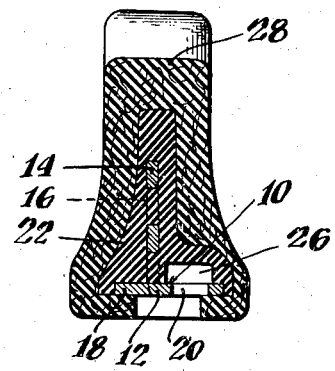
INVENTOR
Harry M. Hood
BY
Alan N. Mann
his ATTORNEY Patented June 4, 1940

2,203,413

UNITED STATES PATENT OFFICE 2,203,413

ARMREST

Harry M. Hood, Chicago, Ill., assignor to Featheredge Rubber Company, Inc., a corporation of Illinois Application February 13, 1939, Serial No. 256,034

3 Claims. (Cl. 155—198)

This invention relates to an armrest for automobiles.

In accordance with the present invention, I provide an armrest that can be readily attached to a door of an automobile so as to lower the cost of assembly if the armrest is included in the original equipment; also the construction of this device permits ready attachment to an existing door. As an incident to the construction of the armrest, it is so made that it has sufficient rigidity to give ample support for the elbow but is sufficiently flexible so that it will not cause injury if one is thrown against it by a jolt or jar.

The essential feature of my invention is that imbedded in each end of the armrest body are two metal plates provided with keyhole slots preferably arranged on a diagonal angle, and these metal plates are connected together by a core of moderately stiff but elastic rubber. Surrounding this core is cushioning material, which preferably is sponge rubber, but other cushioning material such as hair, may be used.

This invention may readily be understood by reference to the accompanying drawing, in which Fig. 1 is a longitudinal sectional view, with parts broken away, of an armrest embodying my invention as attached to a flat surface such as an automobile door;

Fig. 2 is a view of the attachment face of the armrest removed from the door;

Fig. 3 is a sectional view taken on line 3—3 of Fig. 1, and

Fig. 4 is a sectional view taken on line 4—4 of Fig. 1.

In this drawing, the metal locking plates are indicated by the numeral 10 and each is formed of a piece of brass or other appropriate metal bent at right angles to form a face portion 12 and a portion 14 at right angles thereto. The portion 14 may be provided with two openings 16 to give better adherence for the rubber in which it is to be embedded, and a lug 18 may be struck out of the portion 14 and allowed to continue in the plane of the face portion 12. Each of the face portions 12 has a keyhole opening 20 with the smaller part of the opening extending upwardly and outwardly as shown in Fig. 2.

Both of these metal attachment plates 10 are embedded in solid rubber as indicated at 22, which covers each of the plates except for their bottom attachment faces and extends across in the general form of a handle as indicated at 24, to connect the two plates together. The rubber compound selected for this purpose is a fairly stiff one so that the member 24 will have a reasonable degree of rigidity, but at the same time it is substantially short of being hard rubber, as it is necessary that it be susceptible of some stretching. When curing the rubber 24 in place around the attachment plates, provision is made for an opening behind the keyhole slots as indicated at 26 to receive the heads of attachment bolts or screws.

The cushioning effect of the armrest is here provided by sponge rubber 28 which is molded and cured around the solid rubber connecting core member 24.

To attach the armrest to the door of the automobile, two bolts or screws as indicated at 30 are driven into the door 32. The heads of these attachment screws 30 are of a size to enter the larger part of the keyhole slots 20 and their spacing is such that the armrest must be stretched to get the attachment plates over the heads of the screws 30. The natural tension of the rubber will then hold the armrest in locked position, and any added tension, such as that applied by putting weight on the armrest, or by using the armrest as a handle for closing the car door, will simply increase the tension tending to lock these plates on the heads of the attachment screws.

It is understood that the shape of the armrest may be modified in many particulars. Also while I prefer to use sponge rubber as a cushioning medium, other cushioning mediums may be employed. Usually the armrest will be covered with some upholstery material, and where the cushioning element is sponge rubber, this upholstery material may, if desired, be united to the sponge rubber by vulcanization.

I claim:

1. An armrest for automobiles and the like, comprising a pair of metal plates each having a keyhole opening, with the smaller portion of such opening extending outwardly, means for connecting said plates consisting of relatively rigid but elastic rubber in which said plates are embedded, and cushioning material on said rubber connecting means.

2. An armrest as specified in claim 1 in which the cushioning material is sponge rubber.

3. An armrest as specified in claim 1 in which the keyhole openings are arranged on a diagonal angle relative to the main axis of the armrest with the smaller portion of said keyhole openings extending in such a direction that when the armrest is attached in a substantially horizontal position to a vertical plate such smaller portion of the openings will extend upwardly as well as outwardly.

HARRY M. HOOD.